United States Patent
Piwowarski et al.

(10) Patent No.: US 8,412,452 B2
(45) Date of Patent: Apr. 2, 2013

(54) SYSTEM SERVING A REMOTELY ACCESSIBLE PAGE AND METHOD FOR REQUESTING NAVIGATION RELATED INFORMATION

(75) Inventors: James J. Piwowarski, Holly, MI (US); Steven J. Ross, Livonia, MI (US); Richard A. Johnson, Rochester Hills, MI (US)

(73) Assignee: General Motors LLC, Detroit, MI (US)

( * ) Notice: Subject to any disclaimer, the term of this patent is extended or adjusted under 35 U.S.C. 154(b) by 553 days.

(21) Appl. No.: 11/758,213

(22) Filed: Jun. 5, 2007

(65) Prior Publication Data

US 2008/0306681 A1   Dec. 11, 2008

(51) Int. Cl.
G01C 21/00   (2006.01)

(52) U.S. Cl. ........ 701/408; 701/409; 701/420; 701/451; 701/517; 701/538; 340/989; 340/991; 340/993; 340/995.23

(58) Field of Classification Search .............. 701/2, 400, 701/408, 409, 418, 420, 451, 461, 517, 538; 340/988, 989, 990, 991, 993, 995.1, 995.23
See application file for complete search history.

(56) References Cited

U.S. PATENT DOCUMENTS

| | | | |
|---|---|---|---|
| 6,424,910 B1* | 7/2002 | Ohler et al. | 701/202 |
| 6,629,034 B1* | 9/2003 | Kozak et al. | 701/200 |
| 6,678,591 B2* | 1/2004 | Ohmura et al. | 701/29 |
| 6,701,251 B2 | 3/2004 | Stefan et al. | |
| 6,748,426 B1* | 6/2004 | Shaffer et al. | 709/219 |
| 6,970,783 B2 | 11/2005 | Knockeart et al. | |
| 6,978,206 B1 | 12/2005 | Pu et al. | |
| 7,035,734 B2 | 4/2006 | Shaffer et al. | |
| 7,104,447 B1* | 9/2006 | Lopez et al. | 235/384 |
| 7,313,227 B2* | 12/2007 | Jones | 379/88.13 |
| 7,379,811 B2* | 5/2008 | Rasmussen et al. | 701/208 |
| 7,693,652 B2* | 4/2010 | Cheung | 701/200 |
| 2003/0109266 A1 | 6/2003 | Moshe et al. | |
| 2006/0253248 A1 | 11/2006 | Ames et al. | |
| 2007/0016513 A1* | 1/2007 | Kelly et al. | 705/37 |
| 2007/0096945 A1* | 5/2007 | Rasmussen et al. | 340/995.1 |
| 2007/0106468 A1* | 5/2007 | Eichenbaum et al. | 701/211 |
| 2007/0162550 A1* | 7/2007 | Rosenberg | 709/206 |
| 2007/0233384 A1* | 10/2007 | Lee | 701/213 |
| 2008/0004118 A1* | 1/2008 | Van Luchene et al. | 463/42 |
| 2008/0004119 A1* | 1/2008 | Van Luchene et al. | 463/42 |

FOREIGN PATENT DOCUMENTS

| | | |
|---|---|---|
| CN | 1728130 A | 2/2006 |
| CN | 1779416 | 5/2006 |
| CN | 1847793 A | 10/2006 |
| DE | 10105897 | 8/2002 |

OTHER PUBLICATIONS

Wikipedia, "Callcenter," dated Jun. 2, 2007, (9 pages), http://de.wikipedia.org/w/index.php?title=Callcenter&oldid=32646484.
Wikipedia, "Call Centre," dated Jun. 4, 2007, (11 pages), http://de.wikipedia.org/w/index.php?title=Call_centre&oldid=135780566.

* cited by examiner

*Primary Examiner* — Thomas Tarcza
*Assistant Examiner* — Rami Khatib
(74) *Attorney, Agent, or Firm* — Dierker & Associates, P.C.

(57) ABSTRACT

A system serving a remotely accessible page includes a server and the remotely accessible page operatively connected to the server. The remotely accessible page includes a first activation option for initiating a navigation function utilizing no starting point or a starting point entered by a user, and a second activation option for initiating a navigation function utilizing a starting point obtained by the system from a vehicle.

9 Claims, 6 Drawing Sheets

SYSTEM SERVING A REMOTELY ACCESSIBLE PAGE AND METHOD FOR REQUESTING NAVIGATION RELATED INFORMATION

TECHNICAL FIELD

The present disclosure relates generally to a system serving a remotely accessible page and methods for requesting navigation related information.

BACKGROUND

Personalized vehicle navigational directions formulated for a route, having a predetermined starting location and predetermined destination location, have become increasingly popular. Many vehicle operators utilize vehicle navigational directions that are based upon an operator-identified starting location and an operator-identified destination location. In one system, a vehicle location detection system determines the current location of the vehicle, which is utilized as the starting position, and an in-vehicle operator utilizes an in-vehicle user interface panel to input the destination location. In another system, a user may utilize an Internet interface to identify a starting location and a destination location, from which the system may formulate navigational directions. In yet another system, a user may utilize a mobile telephone to input a destination location, and then may receive navigational directions from the mobile telephone's current location to the destination location via the mobile telephone.

In vehicle navigation systems where the starting location is the vehicle's location, as detected by a location detection system, and an in-vehicle operator inputs the destination location at the in-vehicle user interface panel, the navigational options presented to the user (e.g., selecting the shortest route or the fastest route, avoiding freeways/expressways, etc.) and the ease of navigating through the navigation system (e.g., menus) may be limited by the in-vehicle user interface panel. In such a system, the user may be unable to request navigational directions in advance. As an example, the user may be unable to request the formulation of navigational directions to be delivered at a predetermined or to-be-determined time. As another example, the user may also be unable to request the formulation of navigational directions before the vehicle is in a desired starting location.

In vehicle navigation systems where a user requests the navigational directions from a location remote from the vehicle via the Internet, the user is typically required to input both a starting location and a destination location before navigational directions are formulated. It is recognized that "cookies" or other similar digital files stored locally on a computer may allow the computer to recall previously entered starting and/or destination locations, however, such information recall may be limited to locations previously input on a particular computer.

In navigation systems where the starting location is the current location of a mobile phone and the destination location is input in the mobile telephone, the navigational directions are delivered to the mobile phone. It is recognized that inputting the destination location into a mobile telephone may suffer from some of the same drawbacks as described hereinabove with respect to inputting a destination location into an in-vehicle user interface panel. Additionally, the user generally is limited by the location of the mobile phone. Since the starting location is determined by the position of the mobile phone, vehicle navigational directions may be achieved when the user's mobile phone is located in the vehicle (or in close proximity thereto).

SUMMARY

A system serving a remotely accessible page according to example(s) of the present disclosure includes a server and the remotely accessible page operatively connected to the server. The remotely accessible page includes a first activation option for initiating a navigation function utilizing no starting point or a starting point entered by a user, and a second activation option for initiating a navigation function utilizing a starting point obtained by the system from a vehicle.

BRIEF DESCRIPTION OF THE DRAWINGS

Features and advantages the present disclosure will become apparent by reference to the following detailed description and drawings, in which like reference numerals correspond to similar, though not necessarily identical, components. For the sake of brevity, reference numerals or features having a previously described function may not necessarily be described in connection with other drawings in which they appear.

FIGS. 5A through 5E depict examples of a remotely accessible page as a user navigates through an example of the method.

DETAILED DESCRIPTION

Figure 1:
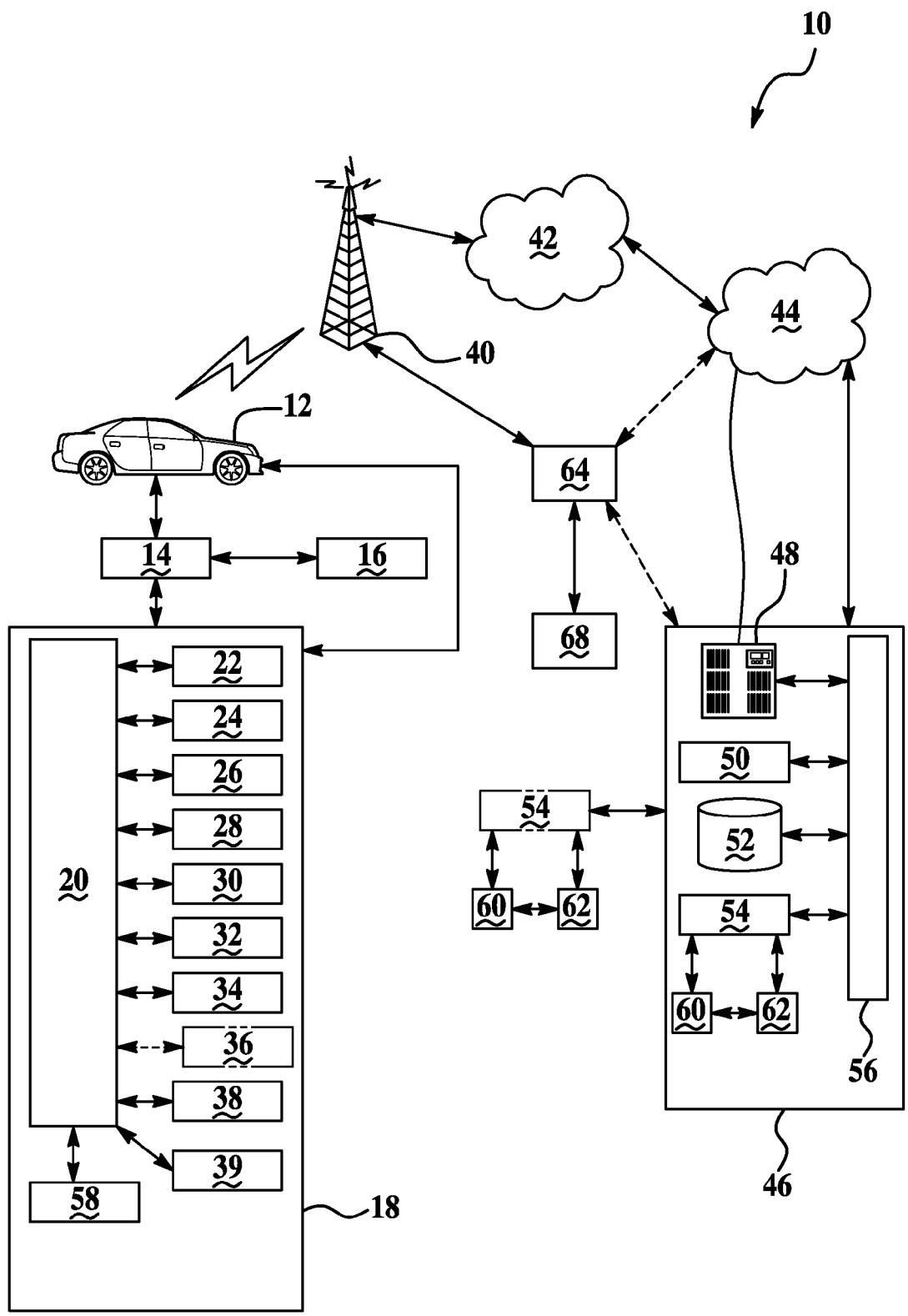
FIG. 1 is a schematic diagram depicting an example of a vehicle navigation system.

Example(s) of the present disclosure address one or more of the drawbacks enumerated above by providing a system that enables a user to request vehicle navigational directions at a location remote from the vehicle, and then retrieve such directions when located in the vehicle. Other example(s) of the present disclosure enable a user to input destination locations at a location remote from the vehicle, and then request vehicle navigational directions using such previously stored destination locations. Still other example(s) of the present disclosure enable a user to request vehicle navigational directions at a location remote from the vehicle using a current or stored vehicle location and an input destination location. As such, example(s) of the system and methods discussed herein advantageously provide for improved formulation and/or delivery of vehicle navigational directions.

It is to be understood that, as defined herein, a user may include a service subscriber and/or a vehicle operator/passenger.

The term "navigation function" includes a program that enables a user to request, obtain and/or save destination entries, navigational directions, maps, and/or the like. The navigation function is executed, for example, by a server in combination with a computer based location mapping system, a computer based navigation system, and/or the like, and/or combinations thereof.

It is to be further understood that, as used herein, "navigational directions" include a series of maneuvers configured to direct a vehicle along a navigational route. As such, in accordance with such definitions, the terms navigational directions and navigational route may be used interchangeably herein. Additionally, "navigational directions" and "navigational route" may be used interchangeably herein with "vehicle navigational directions" and "vehicle navigational route," respectively.

Still further, it is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween). Additionally, two components may be permanently, semi-permanently, or releasably engaged with and/or connected to one another.

Furthermore, "communication" is to be construed to include all forms of communication, including direct communication and indirect communication. As used herein, indirect communication is to be interpreted to include communication between two components having additional component(s) located therebetween.

Referring now to FIG. 1, the system 10 includes a vehicle 12, a vehicle communications network 14, a telematics unit 18, and a wireless communication system (including, but not limited to, one or more wireless carrier systems 40, one or more communication networks 42, and/or one or more land networks 44). In an example, the wireless communication system is a two-way radio frequency communication system. In another example, the wireless communication system also includes one or more call centers 46, and/or one or more servers 64 operatively connected to a remotely accessible page 68 (e.g., a webpage). In yet another example, vehicle 12 is a mobile vehicle with suitable hardware and software for transmitting and receiving voice and data communications. System 10 may include additional components suitable for use in telematics units 18.

A service provider (not shown) is a wireless carrier (such as, for example, Verizon Wireless®, Cingular®, Sprint®, etc.) that provides Internet and/or phone services to the user. The service provider may be located at the call center 46, but it is to be understood that the call center 46 is a separate and distinct entity from the service provider. The service provider may also be located remote from the call center 46. It is to be understood that the service provider may interact with the call center 46 to provide service(s) to the user.

In an example, via vehicle communications network 14, the vehicle 12 sends signals from the telematics unit 18 to various units of equipment and systems 16 within the vehicle 12 to perform various functions, such as unlocking a door, executing personal comfort settings, and/or the like. In facilitating interaction among the various communications and electronic modules, vehicle communications network 14 utilizes interfaces such as controller area network (CAN), ISO standard 11989 for high speed applications, ISO standard 11519 for lower speed applications, and Society of Automotive Engineers (SAE) standard J1850 for high speed and lower speed applications.

The telematics unit 18 may send and receive radio transmissions from wireless carrier system 40. In an example, wireless carrier system 40 may be a cellular telephone system and/or any other suitable system for transmitting signals between the vehicle 12 and communications network 42. Further, the wireless carrier system 40 may include a cellular communication transceiver, a satellite communications transceiver, a wireless computer network transceiver (a non-limitative example of which includes a Wide Area Network (WAN) transceiver), and/or combinations thereof.

Telematics unit 18 may include a processor 20 operatively coupled to a wireless modem 22, a location detection system 24 (a non-limiting example of which is a global positioning system (GPS)), an in-vehicle memory 26, a microphone 28, one or more speakers 30, an embedded or in-vehicle mobile phone 32, a real time clock (RTC) 34, a TTY unit 36, a short-range wireless communication network 38 (e.g. a Bluetooth® unit), and/or a user display panel 39.

The telematics unit 18 may be implemented without one or more of the above listed components, such as, for example, speakers 30. Yet further, it is to be understood that the speaker(s) 30 may be a component of the vehicle audio system (which includes a receiver), which may, in addition to radio broadcasts, accept audio and other signals from the telematics unit 18. Telematics unit 18 may include additional components and functionality as desired for a particular end use.

In an example, the user display panel 39 is equipped with user interface capabilities and, thus, may operate as a user interface panel. As such, the display panel 39 may include one or more input devices or components such as, for example, one or more buttons, knobs, and/or microphones. As non-limiting examples, an input device on the display panel 39 may be utilized to request communication with a call center 46 and/or the server 64 and/or to effectively communicate therewith. A user may, for example, request transmission of vehicle navigational directions by pushing a button or speaking into a microphone operatively disposed on the display panel 39.

Processor 20 may be a micro controller, a controller, a microprocessor, a host processor, and/or a vehicle communications processor. In another example, processor 20 may be an application specific integrated circuit (ASIC). Alternatively, processor 20 may be a processor working in conjunction with a central processing unit (CPU) performing the function of a general-purpose processor.

Non-limiting examples of the location detection system 24 associated with processor 20 include a Global Position Satellite receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

In-vehicle mobile phone 32 may be a cellular type phone, such as, for example an analog, digital, dual-mode, dual-band, multi-mode and/or multi-band cellular phone, and/or may be a TTY-compatible mobile phone.

Also associated with processor 20 is the previously mentioned real time clock (RTC) 34, which provides accurate date and time information to the telematics unit hardware and software components that may require date and time information. In one example, date and time information may be requested from the RTC 34 by other telematics unit components. In other examples, the RTC 34 may provide date and time information periodically, such as, for example, every ten milliseconds.

The TTY unit 36 is a telecommunications device for a hearing-impaired user. The TTY unit 36 may include external components, such as a keyboard or a vibrating wristband, used, for example, to alert the hearing-impaired user of an incoming communication.

Processor 20 may execute various computer programs that interact with operational modes of electronic and mechanical systems within the vehicle 12. It is to be understood that processor 20 controls communication (e.g., signals, such as call signals) between telematics unit 18, wireless carrier system 40, call center 46, server 64, another party, and/or combinations thereof.

Further, processor 20 may generate and accept digital signals transmitted between the telematics unit 18 and the vehicle communication network 14, which is connected to various electronic modules in the vehicle 12. In one example, these digital signals activate the programming mode and operation modes within the electronic modules, as well as provide for data transfer between the electronic modules. In another example, certain signals from processor 20 may be translated into vibrations and/or visual alarms.

It is to be understood that software 58 may be associated with processor 20 for monitoring and/or recording the incoming caller utterances.

The communications network 42 may include services from one or more mobile telephone switching offices and/or wireless networks. Communications network 42 connects wireless carrier system 40 to land network 44. Communications network 42 may be any suitable system or collection of systems for connecting the wireless carrier system 40 to the vehicle 12 and the land network 44.

The land network 44 connects the communications network 42 to the call center 46 and/or the server 64. In one example, land network 44 is a public switched telephone network (PSTN). In another example, land network 44 is an Internet Protocol (IP) network. In still other examples, land network 44 is a wired network, an optical network, a fiber network, another wireless network, and/or any combinations thereof. The land network 44 may be connected to one or more landline telephones. In an example, the communications network 42 and the land network 44 connect the wireless carrier system 40 to the call center 46 and/or the server 64. In another example, the server 64 is connected directly to the wireless carrier system 40 and/or to the call center 46.

Call center 46 contains one or more data switches 48, one or more communication services managers 50, one or more communication services databases 52 containing subscriber profile records and/or subscriber information, one or more communication services advisors 54, and/or one or more network systems 56.

Switch 48 of call center 46 connects to land network 44. Switch 48 transmits voice or data transmissions from call center 46, and receives voice or data transmissions from telematics unit 18 in vehicle 12 through wireless carrier system 40, communications network 42, and land network 44. Switch 48 receives voice transmissions from, or sends voice transmissions to one or more service advisors 54 via one or more network systems 56. Switch 48 receives data transmissions from, or sends data transmissions to one or more communication services managers 50 via one or more network systems 56.

Call center 46 may contain, or may be in communication with, one or more service advisors 54. It is to be understood that the service advisor 54 may be located at the call center 46 or may be located remote from the call center 46 while communicating therethrough. In one example, service advisor 54 is an interactive voice recognition system or an automaton 60. In another example, the service advisor 54 is a human advisor 62. It is to be understood that the call center 46 may include or be in communication with both an interactive voice recognition system 60 and human advisor(s) 62. Furthermore, the interactive voice recognition system 60 and the human advisor(s) 62 may be in selective communication with each other and with the telematics unit 18. In an example, the interactive voice recognition system 60 is located at least partially in the telematics unit 18.

The server 64 may be operatively connected to at least the wireless carrier system 40. In an alternate example, the server 64 is directly or operatively connected to the land network 44 or the call center 46 (illustrated by the phantom lines). It is to be understood that the telematics unit 18 may be in communication with the server 64 via the wireless carrier system 40 alone, or via the communication network 42, land network 44 and/or the call center 46.

Figure 2:
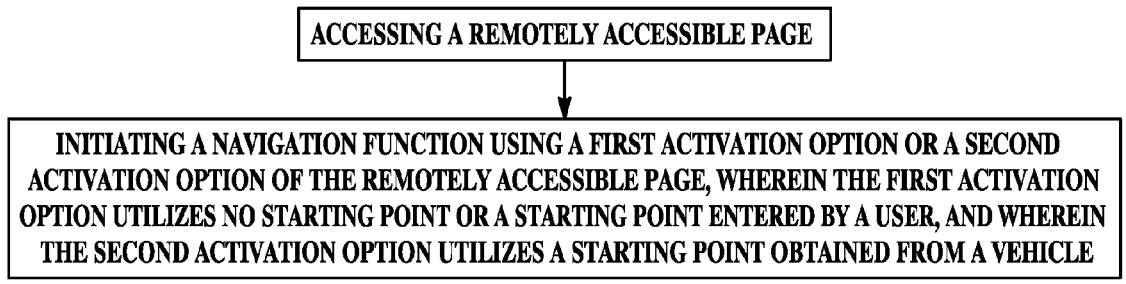
FIG. 2 is a flow diagram depicting an example of a method for requesting navigation related information.
Figure 3:
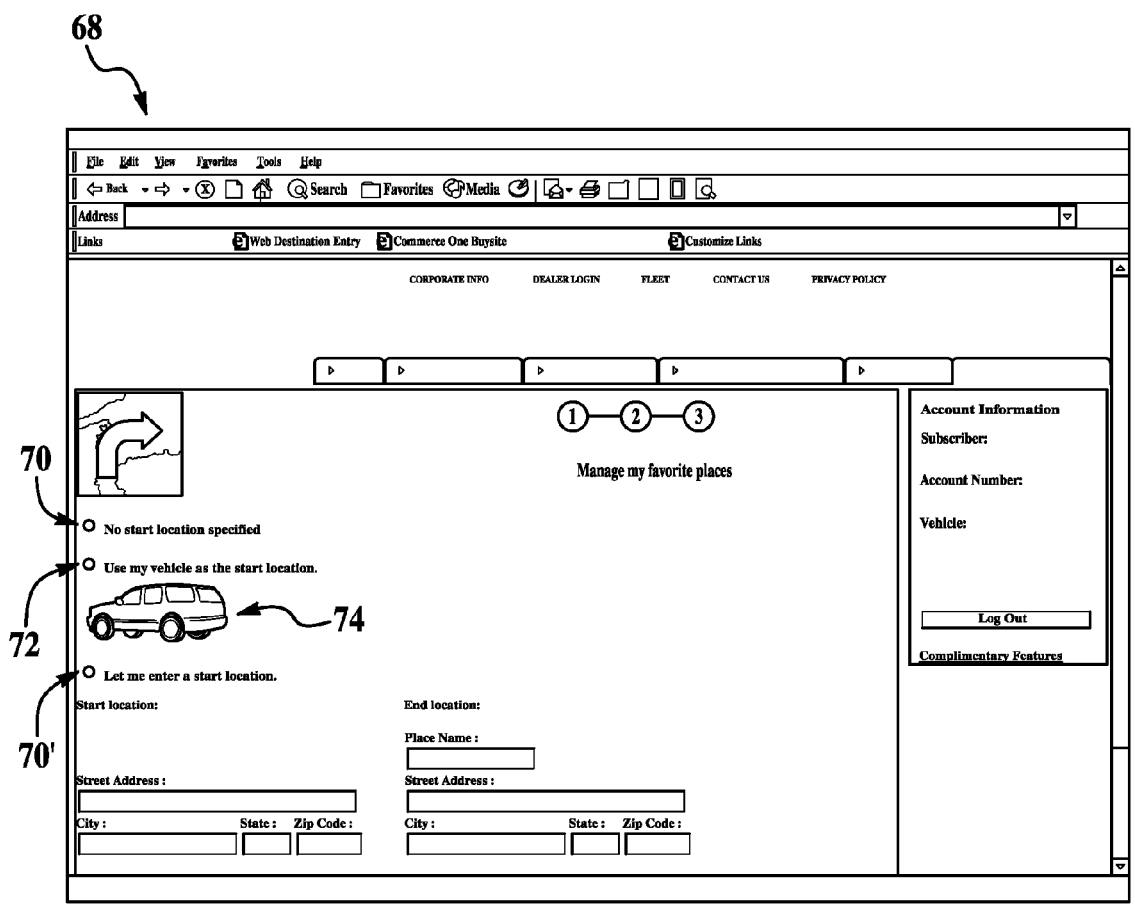
FIG. 3 depicts an example of a remotely accessible page used in examples of the method and system.

Referring now to FIGS. 2 and 3 together, an example of the method (see FIG. 2) for requesting navigation related information, and an example of a remotely accessible page 68 (see FIG. 3) used in performing such a method are depicted. The method shown in FIG. 2 generally includes accessing the remotely accessible page 68; and initiating a navigation function using a first activation option or a second activation option of the remotely accessible page 68.

The remotely accessible page 68 shown in FIG. 3 includes the first activation option 70, 70' and the second activation option 72. The first activation option 70, 70' includes two entry spaces, one of which triggers the navigation function to proceed with no starting point (see reference numeral 70), and the other of which, when selected, triggers the navigation function to proceed with a user entered starting point (see reference numeral 70'). The second activation option 72 includes one entry space, which, when selected, triggers the navigation function to proceed with a starting point obtained from the vehicle 12.

Generally, the remotely accessible page 68 is supported and hosted by the server 64. In an example, the remotely accessible page 68 is accessible to the user via a computer or other device (e.g., desktop, notebook, mobile phone, or personal digital assistant) configured to access the Internet. In an example, the computer or other device includes, or is in communication with, an input device (e.g., a keyboard and/or mouse) and a display (e.g., a monitor and/or one or more speakers). It is to be understood that the communication between the computer or other device and the server 64 may be wired and/or wireless.

The computer or other device is generally at a location that is remote from the vehicle 12. The user may access a personalized account at the remotely accessible page 68 by inputting user-specific information at the page 68. The user specific information may include, for example, the user's name, a password, an account number, and/or any other identifying information. It is to be understood that the personalized account information may be stored and/or accessed by the server 64 or by the call center 46.

In an example, the remotely accessible page 68 may also include personalized graphical and/or textual indicia 74 representing the vehicle 12 associated with the user. As shown in FIG. 3, the graphical indicia 74 includes a representation of the make and model of the vehicle 12 associated with the specific user account that is accessed.

In one example of the method, the user selects the first activation option 70 utilizing no starting point. Generally, in this example, a user is interested in obtaining a map of a desired destination location, or is interested in storing preferred destination locations within their account. As such, a starting point may be unnecessary.

In this example, after selecting the first activation option 70 utilizing no starting point, a user is prompted to enter a destination location. In one example, the server 64, via a location mapping system operatively connected thereto and in response to receiving the destination location, may generate a map including the destination location. The characteristics of the map may be determined by the mapping system and/or based on the information input by the user. For example, a user may request the location of a baseball stadium within ten miles of a particular city. The generated map is presented to the user via the remotely accessible page 68. At this point, the page 68 may also include an option for the user to obtain navigational directions to the entered destination location.

In another example, the user is asked if he/she would like to save the entered destination location as a preferred destination within his/her account. The user may store the destination location under a desirable name. In this example, the saved destination locations are associated with the user and/or the vehicle 12. In an example, the saved destination locations are operatively stored in the server 64 and/or in communication services database(s) 52 of call center 46. The communication services database(s) 52 may also store information indicative of the association between the saved destination locations and a subscriber account/subscriber vehicle 12. When prompted by the user for the saved locations, the server 64 accesses the list or communicates with the call center 46 to obtain such information from the database(s) 52. As a non-limiting example, a user may be required to log-in to the remotely accessible page 68 and server 64 using a unique password, which indicates to the database(s) 52 the particular subscriber account/subscriber vehicle 12 requesting the information, thereby enabling the call center 46 to retrieve and transmit the corresponding list to the user (via the server 64).

The saved destination locations may be useful for subsequent direction requests, and they may be uploaded to the vehicle 12, for example, when the vehicle 12 is started and/or when the user requests (either verbally or via the display panel 39) navigational instructions to one of the saved destination locations. In one example, the telematics unit 18 queries the server 64 for any recent destination locations input via the remotely accessible page 68. The user may then select previously stored destinations from within the vehicle 12, for example, verbally or via display panel 39. It is to be understood that destination locations entered using the telematics unit 18 (e.g., via display panel 39) may also be uploaded to the server 64, thereby enabling synchronization between the two 18, 64.

In another example of the method, the user selects the first activation option 70', which utilizes a user entered starting point. Generally, in this example, a user enters a starting point and a destination location. Upon receiving the information, the server 64 (via a route generation engine operatively connected thereto) generates a route from the starting point to the destination location or requests that the call center 46 (via a route generation engine operatively connected thereto) generate such a route. After the route is generated, the remotely accessible page 68 may inform the user that the route has been generated and is available for immediate or subsequent download. In one example, the user may select to have the route transmitted (e.g., for printing) via the remotely accessible page 68. In another example, the remotely accessible page 68 may provide the user with instructions for downloading the generated route once in the vehicle 12. In the latter example, the route may be stored at the server 64 or at the call center 46 until the user requests the route from within the vehicle 12 (described further hereinbelow).

In this and other examples disclosed herein, the starting point and/or destination location may be manually entered by the user, or may be selected from a list of predetermined starting and/or destination locations operatively stored with/at/in 1) the user's computer, 2) the remotely accessible page 68 (via server 64), 3) the call center 46, and/or 4) the user's account. In the latter three examples, the list of starting points and/or destination locations is stored at a location remote from the computer or other device being used to access the remotely accessible page 68. As such, the list may be accessible to a user from any device capable of accessing the remotely accessible page 68. In another example, the list is stored locally at the device where the starting positions and/or destination locations were previously input or detected. In such an example, an abbreviated list may be accessible at any single device, the abbreviated list including those starting points or destination locations that were input or detected at that particular device.

The user may save preferred starting and/or destination locations (as previously described), or the server 64 may compile the list from one or more destination locations and/or starting locations that were previously input by the user. In an example, the server 64 adds each destination location and/or starting location to the list of predetermined destination locations when it is input or detected. In another example, the server 64 adds an input destination location or starting location to the list when prompted to do so by a user. In yet another example, the server 64 is configured to add a destination location or a starting location to the list of predetermined destination locations once the destination location or starting location has been input or detected a predetermined number of times. As non-limiting examples, the predetermined number of times may be two, three, four, five, etc.

It is to be understood that the list of destination locations may also be non-user specific. Lists of restaurants, churches, theaters, stadiums/arenas, and/or the like may be available to a user to select the destination location. Such lists may be organized via geographic areas.

In one example, the user may enter the starting point and/or destination location as a complete or partial address and/or as a complete or partial name (e.g., a family name for a residence or a business name for a commercial establishment). If the entry is a partial address or partial name, the server 64 may assume a complete name or address therefrom, or may prompt the user to select one or more complete names or addresses from one or more that are provided to the user. Additionally, the server 64 may recognize one or more points of interest within a predetermined distance from the starting location, one of which may be utilized as the destination location. In an example, the server 64 receives a point of interest category (e.g., restaurant, gas station, hotel, airport, etc.) that is input by a user at the remotely accessible page 68, and responds by providing the user with the points of interest that fall within the input category, and that are located within a predetermined distance from the starting point.

The predetermined distance between the starting point and the various points of interest may delineate a predetermined area, which may be defined as a geometric shape that includes the starting point as a center. In an example, the predetermined area is a circle having a radius that corresponds to the distance between the furthest point of interest and the starting point. As such, the starting point is disposed substantially at the center of the circle. In another example, the predetermined distance (or radius) may be a default value determined by the server 64 and/or may by the user. As non-limiting examples, the predetermined distance may be 1 mile, 5 miles, 10 miles, 20 miles, 50 miles, or 100 miles.

Figure 4:
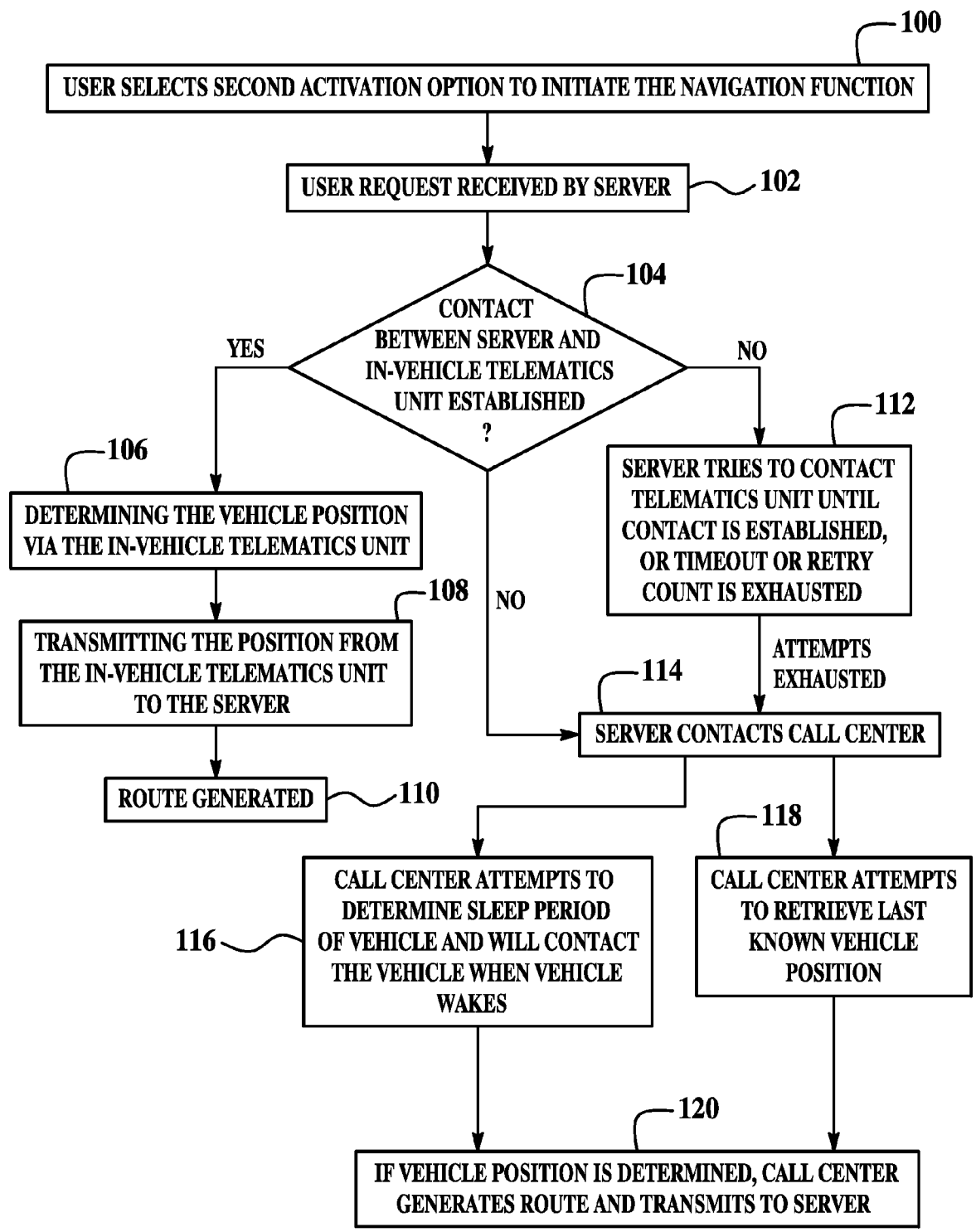
FIG. 4 is a flow diagram depicting examples of the method for requesting navigation related information.

Referring now to FIG. 4, in still other examples of the method, the user selects the second activation option 72 (shown as reference numeral 100) which utilizes a starting point obtained from the vehicle 12. Generally, when the user selects the second activation option 72, the server 64 recognizes the request (shown as reference numeral 102) to obtain the vehicle's current or recent location. The server 64 attempts to communication with the telematics unit 18 (shown as reference numeral 104) to obtain the vehicle position, which is then used as a starting point to generate the requested route.

In one example, attempts to determine the position of the vehicle 12 are initiated substantially simultaneously or sequentially with the time that the destination location is input into the server 64 by the user. In another example, the server 64 attempts to determine the position of the vehicle as soon as the user logs into the program. In still another example, the current location of the vehicle 12 is transmitted from the telematics unit 18 when the user selects the second activation option 72. As such, the server 64 may have access to the vehicle location before and/or after the user selects the second activation option 72.

In one example, in response to the user selecting the second activation option 72, the server 64 initiates a request for the vehicle position. The server 64 begins by requesting direct communication with the telematics unit 18. As previously described, the server 64 is in operative communication with the telematics unit 18 via at least the wireless carrier system 40. Such operative communication enables the server 64 to communicate with the location detection system 24 located within the telematics unit 18 if a connection is established between the server 64 and the telematics unit 18.

In one of the examples shown in FIG. 4, the server 64 establishes communication with the telematics unit 18. In this example, the server 64 queries the telematics unit 18 for the vehicle position, and in response, the location detection system 24 detects the current vehicle position, as shown at reference numeral 106. The telematics unit 18 then transmits the detected vehicle position to the server 64, as shown at reference numeral 108.

The location of the vehicle 12 received by the server 64 is utilized as the starting point for formulating the user requested navigational directions. The server 64 then generates a full or partial route, and informs the user (via the remotely accessible page 68) that the route is ready for immediate and/or subsequent downloading. In examples of the method in which a partial route is generated and stored, it is to be understood that the previously calculated and stored initial maneuvers are delivered to the vehicle 12 upon request of the route, and when the user begins to traverse the route, the remaining maneuvers are generated and transmitted to the vehicle 12.

In the other example shown in FIG. 4, the server 64 fails to establish communication with the telematics unit 18. It is to be understood that successive attempts to contact the telematics unit 18 may be made until a position is determined (at which time a route may be generated, see reference numeral 120), or until a timeout or retry count is exhausted, as shown at reference numeral 112. The timeout or retry count may be any desirable time or number. In this example, the user may be informed of the status of obtaining the vehicle position.

If contact between the server 64 and in-vehicle telematics unit 18 is not achieved, or if attempts to contact the vehicle 12 are exhausted, the server 64 may contact the call center 46 and request the vehicle position from the call center 46, as shown at reference numeral 114. In one example, as shown at reference numeral 116, the call center 46 attempts to determine the discontinuous receive or sleep cycle of the vehicle 12. The call center 46 then attempts to contact the vehicle 12 and retrieve its position when the vehicle 12 is turned on. For example, if an awake period is determined during a vehicle discontinuous receive or sleep cycle, the call center 46 may attempt to synchronize communication with the vehicle during the awake period in order to extract the vehicle position. Generally, the vehicle position may be extracted if the location detection system 24 is active during the awake period.

In still another example, as shown at reference numeral 118, the call center 46 may query a memory location (e.g., in-vehicle memory 26 or a database at the call center 46) where previously determined vehicle positions are stored. As a non-limiting example, the last known vehicle position may be extracted from the memory location and used as the starting point for formulating the requested navigation directions. The call center 46 may also check a location detection system 24 quality indicator that indicates the quality of the stored positions.

In one example, a route-generating engine at the call center 46 calculates a full or partial route (see reference numeral 120) using the vehicle position extracted from the memory location and the destination location input by the user at the remotely accessible page 68. The call center 46 may inform the server 64 that the route has been generated, and in response, the server 64 may inform the user that the route is being stored for subsequent download. In such examples, the call center 46 may store the route for transmission to the vehicle 12 upon receiving a subsequent request. The call center 46 may also transfer the generated route to the server 64 for presentation to the user via the remotely accessible page 68.

Obtaining vehicle positions using the remotely accessible page 68 advantageously enables a full or partial route to be generated in advance of a user being present in the vehicle 12. The user may then be informed, via the remotely accessible page 68, that the full or partial route has been generated. The user may also be presented with instructions on how to retrieve the generated route when in the vehicle 12.

It is to be understood, in any of the examples disclosed herein, that one or more set of navigational directions may be generated and presented to the user via the remotely accessible page 68. From this list, the user may select a particular set of navigational directions along a preferred navigational route. The user may then select the preferred navigational route. As non-limiting examples, the user may select the preferred navigational route based, at least partially, upon: the length of the navigational route(s); the estimated time to travel the navigational route(s); the amount of expressway travel included in the navigational routes(s); the amount of toll required to travel the navigational route(s); and/or the number of identified points of interest along the navigational route(s); and/or combinations thereof. In this example, once a preferred navigational route has been selected, if required, the navigational directions associated with the preferred navigational route are formulated for transmittal to the user/vehicle.

In any of the examples disclosed herein which result in the formulation of partial or full navigation directions, the navigational directions are transmitted to the vehicle 12 in response to a demand therefor. As such, the server 64 and/or the call center 46 may save the generated instructions until the user demands such instructions/directions. Furthermore, the saved instructions may be updated if the user moves the vehicle 12 prior to demanding the instructions. Upon a user request from the vehicle 12 for such previously generated instructions, the server 64 and/or call center 46 may query for an updated vehicle position to ensure that the previously generated instructions are still accurate.

The server 64 and/or call center 46 may transmit the formulated navigational directions to the in-vehicle telematics unit 18 via at least the wireless carrier system 40. In an example, the navigational directions are transmitted through the land network 44 before passing through the communication network 42 and the wireless carrier system 40 to the telematics unit 18.

As a non-limiting example, the navigational directions may be demanded by a user via in-vehicle display panel 39. In this example, the current location of the vehicle 12 is determined at the time of the demand for the navigational directions. As a non-limiting example, a user may input a destination location into the server 64 via the remotely accessible page 68 and request the formulation of navigational directions from the vehicle's 12 then-current location to the input destination location. Then, at a later time, the user may demand (e.g., via the display panel 39) that those previously requested navigational directions be transmitted to the vehicle 12. In response to the demand for the navigational directions, the call center 46 will detect the current location of the vehicle 12, and will transmit the navigation instructions to the vehicle 12 if the pre-calculated instructions are accurate. If the vehicle position has changed, the call center 46 will regenerate and transmit the navigational instructions.

In an example, the navigational directions are transmitted to the telematics unit 18 in real-time. Generally, the telematics unit 18 may receive the navigational directions in a plurality of predetermined segments at predetermined intervals. More specifically, the navigational directions may be transmitted to the telematics unit 18 as a particular instruction is necessary (e.g., at a predetermined time before reaching a required vehicle maneuver) for the user to travel the navigational route. In another example, navigational directions are transmitted to the telematics unit 18 in their entirety. In such an example, the telematics unit 18 may transfer the navigational directions to the in-vehicle display panel 39 in real-time.

The in-vehicle display panel 39 may receive the navigational directions from the in-vehicle telematics unit 18 and may provide the navigational directions to an in-vehicle user. In an example, the navigational directions are provided to the user audibly, visually, and/or tactilely. As non-limiting examples, the user display panel 39 may display the navigational directions as one or more audio prompts, textual instructions, graphical maps, and/or vibrations. In an example, the vehicle speakers 30 are operatively embodied in the user display panel 39 such that the navigational directions may be transmitted as audio prompts from the telematics unit 18 to the display panel 39 for production over the vehicle speakers 30.

As non-limiting examples, providing the navigational directions to a user in real-time may be preferable for a navigational route delivered to a user audibly, and providing the navigational directions in their entirety may be preferable for a navigational route delivered to a user visually (e.g., a map displayed on the panel 39 screen). In yet another example, the navigational route is provided audibly and visually to a user from the display panel 39 (and, optionally, the speakers 30) substantially simultaneously or sequentially. Still further, tactile signals (e.g., vibrations at predetermined areas of the steering wheel) are delivered that are indicative of an upcoming maneuver. Generally, tactile signals are sent in conjunction with audio or visual navigation instructions.

In one or more examples disclosed herein, any current position of the vehicle 12 may be time dependent, and the time at which the position is detected may affect the formulated navigational directions. As such, the server 64 and/or the call center 46 may query the telematics unit 18 for an updated vehicle position at any time, for example, upon the occurrence of some triggering event. In one example, even when a user has not accessed the remotely accessible page 68, the server 64 and/or call center 46 may request vehicle position, for example, upon recognition of vehicle ignition initiation, or upon recognition of a wake up period of a discontinuous receive or sleep cycle. A user logging into his/her account may also trigger the server 64 and/or call center 46 to request an updated vehicle position. Furthermore, vehicle ignition initiation may trigger the telematics unit 18 to send its current position to the server 64 and/or call center 46. As such, if or when the user activates the second activation option 72, the server 64 and/or call center 46 is capable of updating the starting point with the most recently received position information. Periodic requests for vehicle position and storage of such information may be particularly useful for formulating navigation directions even when the telematics unit 18 is unreachable.

Figure 5A:
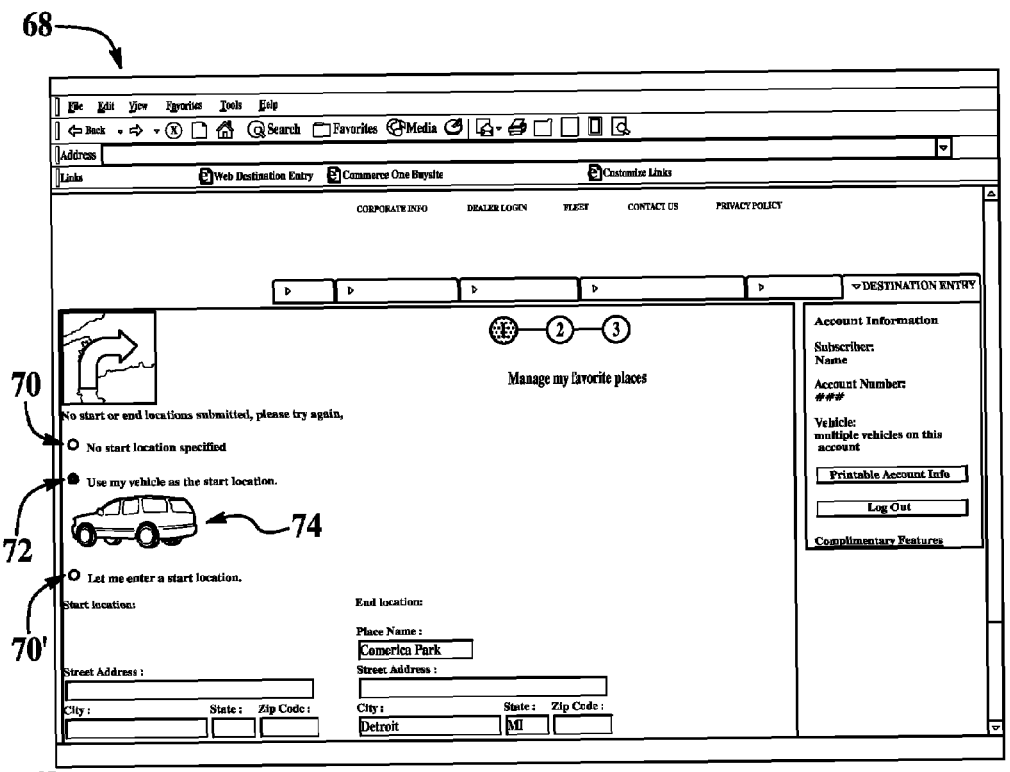

Referring now to FIGS. 5A through 5E, one example of the method is shown via different screens of the remotely accessible page 68. As shown in FIG. 5A, a user logs into his/her personal account, and is presented with the first and second activation options 70, 70', 72. The remotely accessible page 68 also enables the user to input information regarding the starting point and the destination location. In this example, the user has selected the second activation option and has entered a destination location.

Figure 5B:
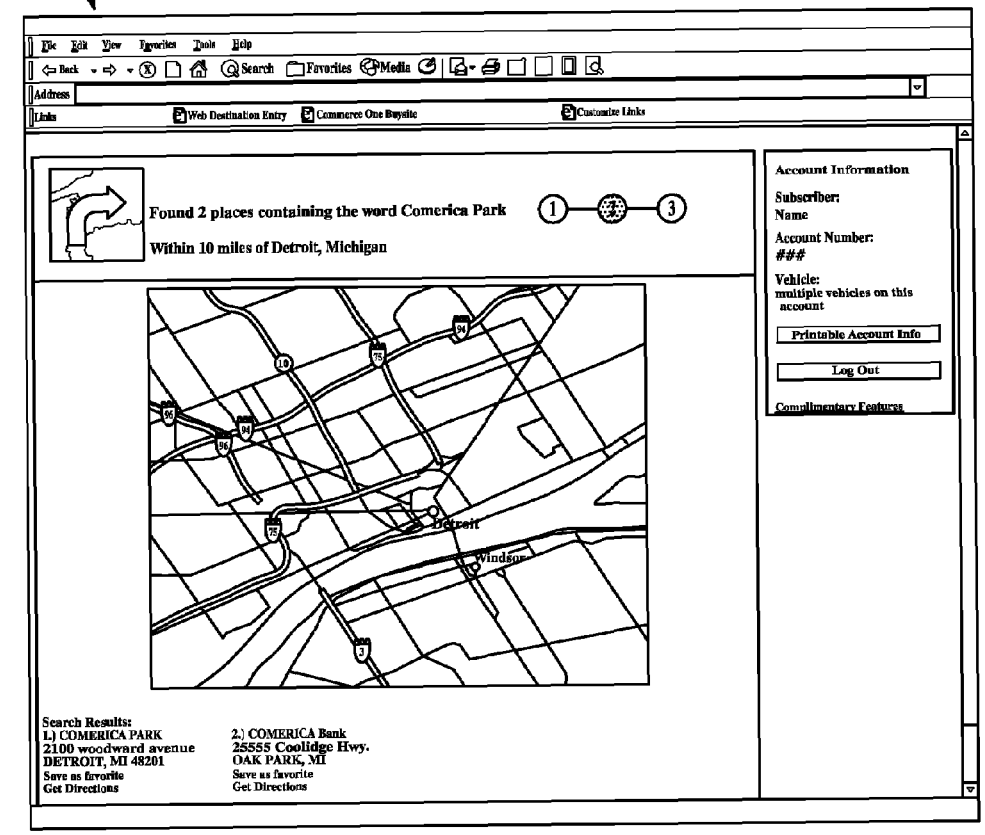

The server 64 receives the information and searches one or more databases for the entered destination entry. As shown in FIG. 5B, the server 64 may find more than one destination location that matches the user's entry. The user may then select to "get directions" for the desired destination from those listed. The user may also save one or more of the listed destinations as a preferred destination, as previously described.

Figures 5C, 5D:
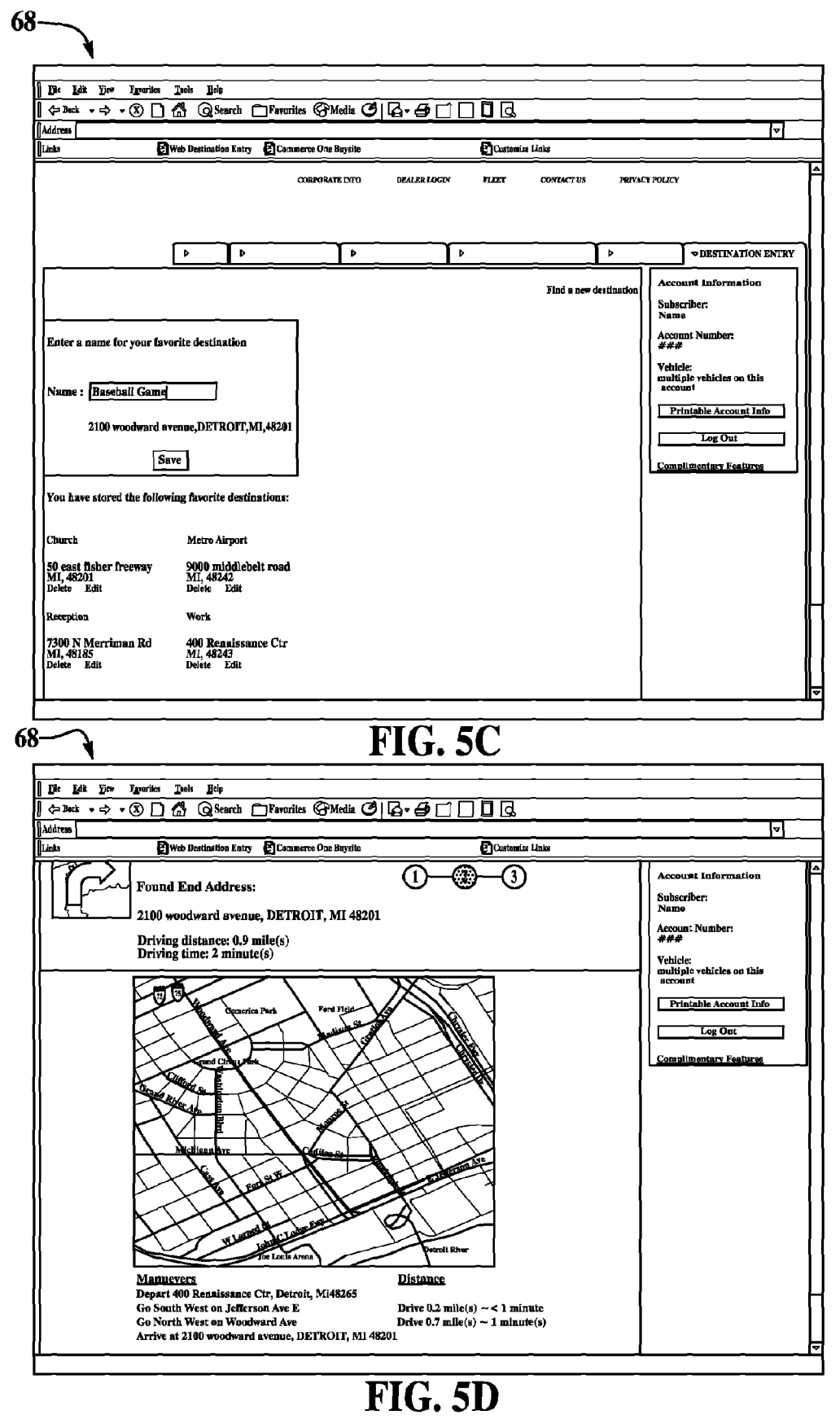

As shown in FIG. 5C, the user selects to save one of the destination locations in his/her account as a favorite destination. As depicted, the user is prompted to enter a name for the destination. Upon doing so and clicking "save", the selected destination location is saved in the user's account under the selected name. As shown in FIG. 5C, the user has previously saved four other favorite destination locations.

FIG. 5D depicts an example of the remotely accessible page 68 after the user selects one of the listed destinations. The server 64 uses examples previously described to determine the vehicle position (to use as a starting point) in accordance with the user's selection of the second activation option 72. FIG. 5D illustrates both text and a map of the calculated navigational directions. In the example shown in this series of figures, the server 64 is able to access a vehicle position to use as the starting point. More particularly, 400 Renaissance Ctr, Detroit, Mich. is determined by the system to be the starting point.

Figure 5E:
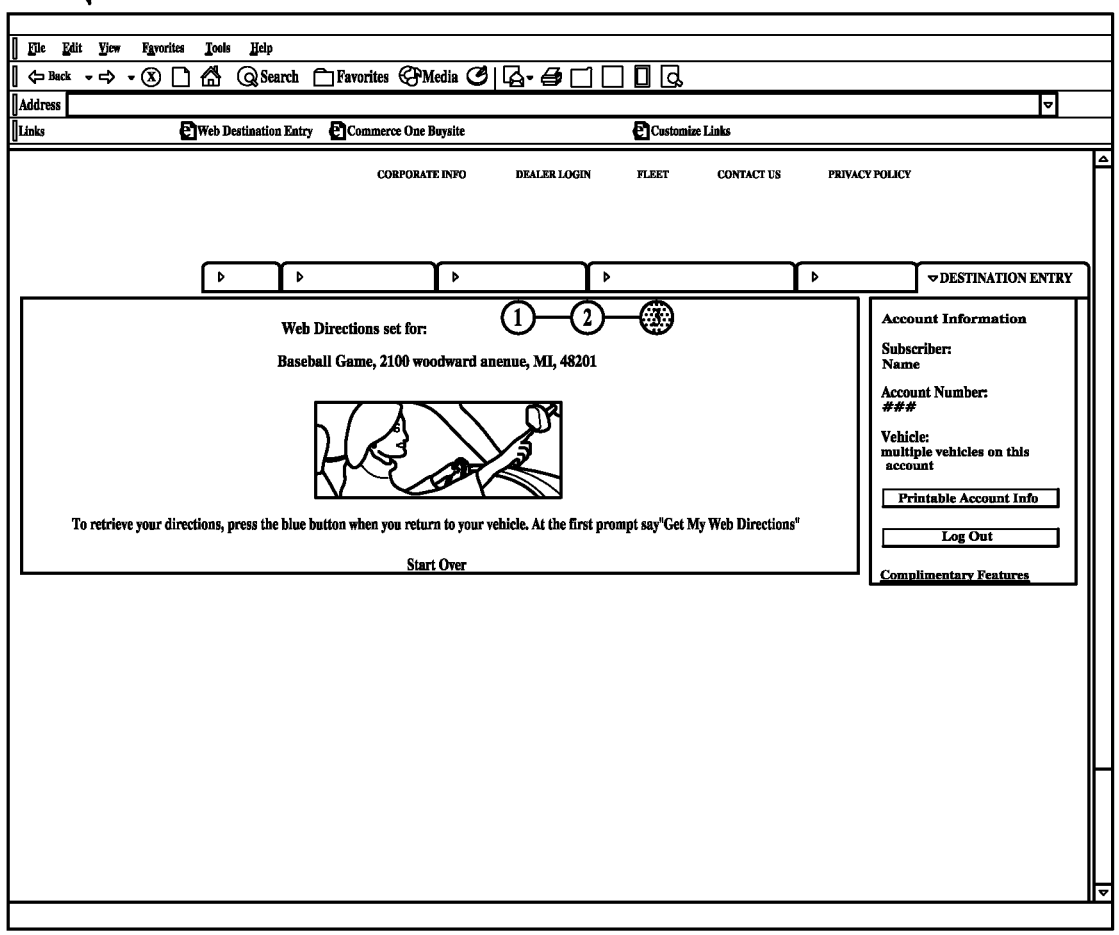

As depicted in FIG. 5E, the remotely accessible page 68 may also provide instructions for the user for retrieving the generated instructions when in the vehicle 12.

It is to be understood that receiving the current vehicle location in the manner disclosed herein may advantageously simplify the process of requesting vehicle navigational directions for a user by removing the step of manually entering the vehicle starting location.

While several examples have been described in detail, it will be apparent to those skilled in the art that the disclosed examples may be modified. Therefore, the foregoing description is to be considered exemplary rather than limiting.

The invention claimed is:

1. A system serving a remotely accessible page, comprising:
- a server;
- the remotely accessible page stored on the server, the remotely accessible page including:
  - a first activation option including two entry spaces, one of the two entry spaces for initiating a navigation function utilizing no starting point, and an other of the two entry spaces for initiating a navigation function utilizing a starting point entered by a user; and
  - a second activation option including an entry space for initiating a navigation function utilizing a starting point obtained by the system from a vehicle;
- a communication module of the server in operable communication with one of i) a remote call center having access to location information of the vehicle in response to establishing a mobile connection with the vehicle, or ii) a location detection system within the vehicle through a mobile connection with the vehicle; and
- at least one of a computer based location mapping system or a computer based navigation system responsive to the communication module of the server and the second activation option for generating navigational instructions from the vehicle, using a vehicle location received from the call center or location detection system, to a destination;
- wherein the server is operable to transmit the navigation instructions to the vehicle.

2. The system as defined in claim 1 wherein the navigation function is executed by the at least one of the computer based location mapping system or the computer based navigation system.

3. The system as defined in claim 1 wherein the vehicle includes an in-vehicle telematics unit in operative communication with the location detection system and in selective operative communication with the server.

4. The system as defined in claim 3 wherein the server is configured to receive the starting point from the in-vehicle telematics unit.

5. The system as defined in claim 4 wherein the server initiates a request responsive to a user selection of the second activation option, and wherein the in-vehicle telematics unit is responsive to the request from the server.

6. The system as defined in claim 1 wherein the call center is in operative communication with the server and in operative communication with an in-vehicle telematics unit.

7. The system as defined in claim 6 wherein the server initiates a request responsive to a user selection of the second activation option, and wherein the call center is responsive to the request from the server.

8. The system as defined in claim 1 wherein the remotely accessible page includes a graphical indicia representing a make and model of the vehicle.

9. The system as defined in claim 8 wherein the graphical indicia is based upon information in an account of the user accessing the remotely accessible page.

* * * * *